US010762904B2

(12) United States Patent
Toma et al.

(10) Patent No.: US 10,762,904 B2
(45) Date of Patent: Sep. 1, 2020

(54) ELECTRONIC DEVICE AND METHOD OF OPERATING THE SAME

(71) Applicant: Samsung Electronics Co., Ltd., Suwon-si, Gyeonggi-do (KR)

(72) Inventors: Anas Toma, Amman (JO); Ahmad Abu Shariah, Amman (JO); Hadi Jadallah, Amman (JO)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 15/441,977

(22) Filed: Feb. 24, 2017

(65) Prior Publication Data
US 2018/0033438 A1  Feb. 1, 2018

(30) Foreign Application Priority Data
Jul. 26, 2016 (KR) ........................ 10-2016-0094821

(51) Int. Cl.
*G10L 15/00* (2013.01)
*G10L 17/00* (2013.01)
(Continued)

(52) U.S. Cl.
CPC ............ *G10L 17/005* (2013.01); *G10L 15/22* (2013.01); *G10L 17/04* (2013.01);
(Continued)

(58) Field of Classification Search
CPC ...................................................... G10L 15/00
(Continued)

(56) References Cited

U.S. PATENT DOCUMENTS 5,913,192 A * 6/1999 Parthasarathy ......... G10L 17/24
704/244
6,480,825 B1 * 11/2002 Sharma .................. G10L 17/26
704/270
(Continued)

FOREIGN PATENT DOCUMENTS

KR    10-2015-0087025 A    7/2015

OTHER PUBLICATIONS

Garfinkel (1998), (Retrieved on Feb. 10, 2009), "History of Speech & Voice Recognition and Transcription Software", www.dragonmedical-transcription.com/history_speech_recognition_html.
(Continued)

*Primary Examiner* — Michael Colucci
(74) *Attorney, Agent, or Firm* — Jefferson IP Law, LLP

(57) ABSTRACT

A method of operating an electronic device and an electronic device thereof are provided. The method includes receiving a first voice signal of a first user, authenticating whether the first user has authority to control the electronic device, based on the first voice signal, and determining an instruction corresponding to the first voice signal based on an authentication result and controlling the electronic device according to the instruction. The electronic device includes a receiver configured to receive a first voice signal of a first user and at least one processor configured to authenticate whether the first user has authority to control the electronic device based on the first voice signal, determine an instruction corresponding to the first voice signal, and control the electronic device according to the instruction.

18 Claims, 8 Drawing Sheets

(51) Int. Cl.
*G10L 17/04* (2013.01)
*G10L 15/22* (2006.01)
*H04N 21/422* (2011.01)
*H04N 21/4415* (2011.01)
*G10L 15/08* (2006.01)

(52) U.S. Cl.
CPC ... H04N 21/42222 (2013.01); H04N 21/4415 (2013.01); *G10L 2015/088* (2013.01); *G10L 2015/223* (2013.01)

(58) Field of Classification Search
USPC ....... 704/500, 251, 254, 247, 246, 243, 249, 704/273; 379/88.17, 202.01; 713/168, 713/155
See application file for complete search history.

(56) References Cited

U.S. PATENT DOCUMENTS

| | | | | |
|---|---|---|---|---|
| 6,681,205 | B1* | 1/2004 | San Martin | G10L 17/24 704/243 |
| 7,386,448 | B1* | 6/2008 | Poss | G10L 17/24 379/188 |
| 9,638,537 | B2* | 5/2017 | Abramson | G01C 21/3626 |
| 9,639,682 | B2* | 5/2017 | North | G06F 21/32 |
| 10,257,179 | B1* | 4/2019 | Saylor | H04L 63/08 |
| 2003/0210770 | A1* | 11/2003 | Krejcarek | H04M 3/42382 379/88.17 |
| 2006/0080432 | A1* | 4/2006 | Spataro | H04L 67/38 709/224 |
| 2006/0106605 | A1* | 5/2006 | Saunders | G10L 17/04 704/246 |
| 2008/0140415 | A1* | 6/2008 | Shostak | G10L 17/00 704/270.1 |
| 2008/0253549 | A1* | 10/2008 | Loveland | H04L 67/2823 379/202.01 |
| 2011/0010543 | A1* | 1/2011 | Schmidt | G06F 21/57 713/168 |
| 2011/0066634 | A1* | 3/2011 | Phillips | G10L 15/22 707/769 |
| 2012/0089392 | A1* | 4/2012 | Larco | G10L 15/063 704/231 |
| 2013/0179681 | A1* | 7/2013 | Benson | G06F 21/31 713/155 |
| 2013/0246066 | A1* | 9/2013 | Choi | G06Q 20/40 704/246 |
| 2014/0136195 | A1* | 5/2014 | Abdossalami | H04M 3/2236 704/235 |
| 2014/0274211 | A1* | 9/2014 | Sejnoha | G10L 17/22 455/563 |
| 2014/0380445 | A1* | 12/2014 | Tunnell | H04L 63/18 726/7 |
| 2015/0206529 | A1 | 7/2015 | Kwon et al. | |
| 2015/0220715 | A1* | 8/2015 | Kim | G06F 21/46 726/18 |
| 2015/0365750 | A1* | 12/2015 | Sun | H04R 1/08 381/122 |
| 2016/0104480 | A1* | 4/2016 | Sharifi | G10L 15/285 704/254 |
| 2016/0155443 | A1* | 6/2016 | Khan | G10L 15/22 704/275 |
| 2016/0232893 | A1* | 8/2016 | Subhojit | G10L 17/22 |
| 2016/0283463 | A1* | 9/2016 | M R | G06N 5/022 |
| 2016/0379635 | A1* | 12/2016 | Page | G10L 15/063 704/251 |
| 2017/0025124 | A1* | 1/2017 | Mixter | G10L 15/22 |
| 2017/0140760 | A1* | 5/2017 | Sachdev | G10L 17/06 |

OTHER PUBLICATIONS

Markus Forsberg, "Why is Speech Recognition Difficult?", Department of Computing Science, Chalmers University of Technology, Feb. 24, 2003, Gothenburg, Sweden.

Daniel Jurafsky et al., "Speech and Language Processing: an Introduction to Natural Language Processing, Computational Linguistics, and Speech Recognition", Prentice Hall, 2000, Upper Saddle River, NJ, USA.

Jinyu Li et al., "An Overview of Noise-Robust Automatic Speech Recognition", IEEE Trans. Audio, Speech, and Language Processing, 2013.

* cited by examiner

ELECTRONIC DEVICE AND METHOD OF OPERATING THE SAME

CROSS-REFERENCE TO RELATED APPLICATION(S)

This application claims the benefit under 35 U.S.C. § 119(a) of a Korean patent application filed on Jul. 26, 2016, in the Korean Intellectual Property Office and assigned Serial number 10-2016-0094821, the entire disclosure of which is hereby incorporated by reference.

TECHNICAL FIELD

The present disclosure relates to an electronic device and a method of operating the same.

BACKGROUND

Users prefer to use electronic devices conveniently. Accordingly, technology for easily controlling electronic devices has been gradually developed. That is, the technology for easily controlling electronic devices has been developed from a method of controlling an electronic device by using an inputter attached to the electronic device to a method of using an external remote control that may be controlled within a short distance.

As the use of display units including touch panels in electronic devices has become generally accepted, technologies for controlling electronic devices though touch inputs have become more commonly used. Furthermore, technology for recognizing voices of users in electronic devices through voice recognition and thereby controlling the electronic devices is also used. Therefore, there is a need to develop technology for easily controlling, by users, electronic devices by using voices of the users.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method of easily controlling the electronic device by using users' voices even when external noise or multiple users exist.

Additional aspects will be set forth in part in the description which follows and, in part, will be apparent from the description, or may be learned by practice of the presented embodiments.

In accordance with an aspect of the present disclosure, a method of operating an electronic device is provided. The method includes receiving a first voice signal of a first user, authenticating whether the first user has authority to control the electronic device, based on the first voice signal, determining a first instruction corresponding to the first voice signal based on an authentication result and controlling the electronic device according to the first instruction.

The method may further include receiving a second voice signal of the first user and determining whether the second voice signal comprises a trigger signal and when the second voice signal comprises the trigger signal, setting the first user as a user who controls the electronic device based on the second voice signal, and controlling the electronic device by using at least one voice signal of the first user.

The setting of the first user as the user who controls the electronic device includes extracting, from the second voice signal, a value of at least one voice parameter regarding the first user, storing the value of the at least one voice parameter extracted from the second voice signal as a reference value and registering the first user as the user who controls the electronic device.

The at least one voice parameter includes at least one of a voice energy of the first user, a frequency bandwidth, a vibration value generated during an utterance by the first user, and a voice signal to noise ratio (SNR).

The method may further include, when the second voice signal does not comprise the trigger signal, authenticating whether the first user has the authority to control the electronic device based on the second voice signal.

The method may further include, when the first user has the authority to control the electronic device, determining a second instruction for performing a first function of the electronic device based on the first voice signal, and performing the first function of the electronic device according to the second instruction.

The method may further include, when the first user does not have the authority to control the electronic device, determining a second instruction for bypassing the first voice signal and bypassing the first voice signal according to the second instruction.

The method further includes receiving a plurality of voice signals from a plurality of users, extracting voice characteristics respectively from the plurality of voice signals, detecting a second voice signal comprising a voice characteristic that matches a voice characteristic of a second user who has the authority to control the electronic device, the voice characteristic of the second user being selected from among the voice characteristics extracted respectively from the plurality of voice signals, and determining a second instruction corresponding to the second voice signal and controlling the electronic device according to the second instruction.

The method may further include, when there is a plurality of users who have the authority to control the electronic device and voice signals are received from the plurality of users who have the authority to control the electronic device, determining a second instruction corresponding to a voice signal of a second user from among the plurality of users according to preset criteria, and controlling the electronic device according to the second instruction.

The preset criteria may include priorities respectively assigned to the plurality of users based on a preset order or a use pattern of the electronic device with regard to each of the plurality of users.

The use pattern of the electronic device is obtained based on at least one of a use frequency of the electronic device and a use time of the electronic device with regard to each of the plurality of users.

In accordance with another aspect of the present disclosure, an electronic device is provided. The electronic device includes a receiver configured to receive a first voice signal of a first user and at least one processor configured to authenticate whether the first user has authority to control the electronic device based on the first voice signal, determine a first instruction corresponding to the first voice signal, and control the electronic device according to the first instruction.

The receiver is further configured to receive a second voice signal of the first user, the at least one processor is further configured to determine whether the second voice signal includes a trigger signal, and when the second voice signal includes the trigger signal, the at least one processor is further configured to set the first user as a user who controls the electronic device based on the second voice signal such that the electronic device is controlled by at least one voice signal of the first user.

The at least one processor is further configured to extract, from the second voice signal, a value of at least one voice parameter regarding the first user, store the extracted value of the at least one voice parameter as a reference value of the at least one voice parameter, and register the first user as the user who controls the electronic device.

When the second voice signal does not comprise the trigger signal, the at least one processor is further configured to authenticate whether the first user has the authority to control the electronic device.

When the first user has the authority to control the electronic device, the at least one processor is further configured to determine a second instruction for performing a first function of the electronic device based on the first voice signal and perform the first function of the electronic device according to the second instruction.

When the first user does not have the authority to control the electronic device, the at least one processor is further configured to determine a second instruction for bypassing the first voice signal based on the first voice signal, and bypass the first voice signal according to the second instruction.

The receiver is further configured to receive a plurality of voice signals from a plurality of users, and the at least one processor is further configured to extract voice characteristics respectively from the plurality of voice signals, detect a second voice signal comprising a voice characteristic that matches a voice characteristic of a second user who has the authority to control the electronic device, the voice characteristic of the second user being selected from among the voice characteristics extracted respectively from the plurality of voice signals, and control the electronic device based on a second instruction corresponding to the second voice signal.

When there is a plurality of users who have the authority to control the electronic device and voice signals are received from the plurality of users who have the authority to control the electronic device, the at least one processor is further configured to determine a second instruction corresponding to a voice signal of a second user from among the plurality of users according to preset criteria and control the electronic device according to the second instruction.

The preset criteria comprise priorities respectively assigned to the plurality of users based on a use pattern of the electronic device with regard to each of the plurality of users.

According to an aspect of another embodiment of the present disclosure, there is provided a non-transitory computer-readable recording medium having recorded thereon a program which, when executed by a computer, performs the method of operating the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
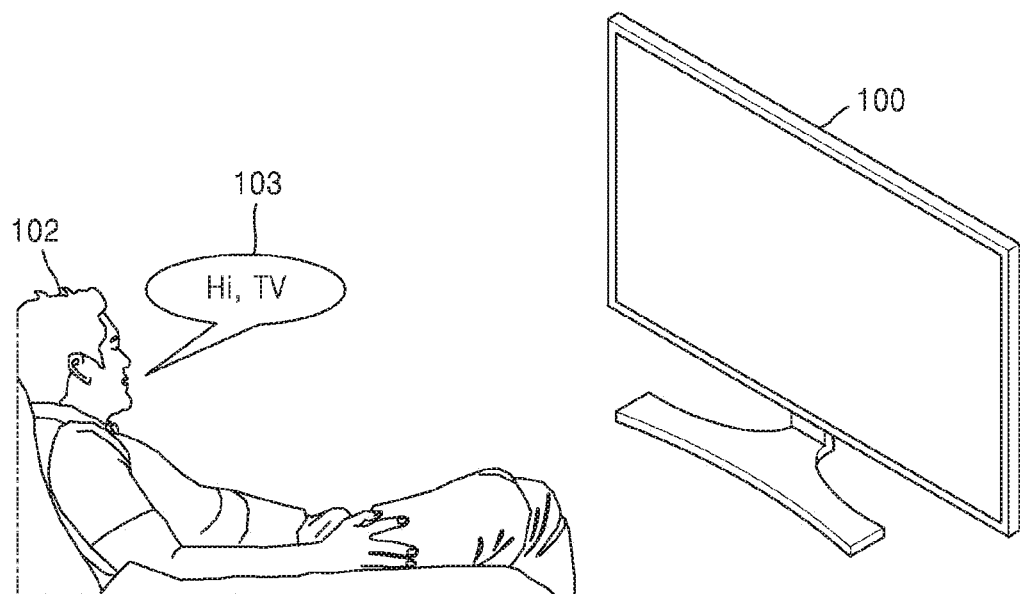
FIG. 1 is a conceptual view for explaining a method of operating an electronic device by using voice signals of a user, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in this specification are those general terms currently widely used in the art in consideration of functions regarding the present disclosure, but the terms may vary according to the intention of those of ordinary skill in the art, precedents, or new technology in the art. Also, specified terms may be selected by the applicant, and in this case, the detailed meaning thereof will be described in the detailed description of the present disclosure. Thus, the terms used in the specification should be understood not as simple names but based on the meaning of the terms and the overall description of the present disclosure.

Throughout the specification, when a portion "includes" an element, another element may be further included, rather than excluding the existence of the other element, unless otherwise described. Also, the terms "unit, "module", etc. are software components and/or hardware components such as a field-programmable gate array (FPGA) or an application specific integrated circuit (ASIC) and perform certain functions. However, units are not limited to software and/or hardware components. The units may be included in storage media for performing addressing and may be executed by at least one processor. Thus, the "units" include components such as software components, object-oriented software components, class components, and task components, processes, functions, attributes, procedures, sub-routines, segments of program codes, drivers, firmware, micro codes, circuits, data, databases, data structures, tables, arrays, and variables. The components and "units" may be integrated into a smaller number of components and "units" or divided into a larger number of components and "units".

It will be understood that although the terms first and second are used herein to describe various elements, these elements should not be limited by these terms. These terms are only used to distinguish one element from another element. Thus, a first element discussed below could be termed a second element, and similarly, a second element may be termed a first element without departing from the teachings of this disclosure. As used herein, the term "and/or" includes any and all combinations of one or more of the associated listed items.

Throughout the specification, the term "electronic device" indicates a device operating based on electric energy. Although an "electronic device" in the present specification is a "television (TV)", the present disclosure is not limited thereto. The electronic device may be any device operating based on electric energy.

FIG. 1 is a conceptual view for explaining a method of operating an electronic device by using voice signals of a user, according to an embodiment of the present disclosure.

Referring to FIG. 1, a user 102 may control an electronic device such as a TV 100 by using the voice signals. The user 102 may perform user registration to control the TV 100 by using the voice signals. In particular, when the user 102 generates a trigger signal such as "Hi, TV" 103, the TV 100 may receive a voice signal of "Hi, TV" 103 and may proceed with a user registration process.

The TV 100 may extract, from the voice signals of the user 102, voice characteristics that distinguish a user from other users and may set the user 102 as a user who is capable of controlling the TV 100 based on the extracted voice characteristics. The user 102 who is not registered as the user who is capable of controlling the TV 100 may not control the TV by using voices. Controlling the electronic device through the voice signals of the user 102 will be described in detail with reference to FIGS. 2 to 4, 5A, 5B, 5C, 5D, and 6 to 8.

In addition, the electronic device herein is a TV, but this is merely an example. The electronic device may be, for example, a tablet personal computer (PC), a digital camera, a camcorder, a laptop computer, a personal digital assistant (PDA), a mobile computer, or the like, all of which have voice recognition functions.

Figure 2:
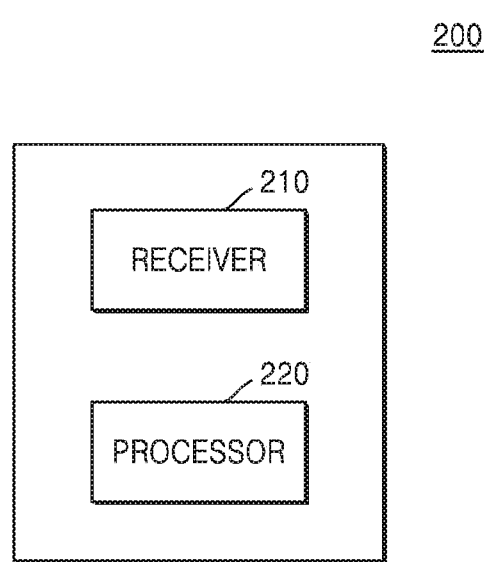
FIG. 2 is a block diagram of a structure of an electronic device according to an embodiment of the present disclosure.

FIG. 2 is a block diagram of a structure of an electronic device 200 according to an embodiment of the present disclosure.

Referring to FIG. 2, according to an embodiment of the present disclosure, the electronic device 200 may include a receiver 210 and a processor 220 (e.g. at least one processor). The electronic device 200 (e.g., a TV) may be embodied by more or less components than the components shown in FIG. 2. Hereinafter, the components will be described in sequence.

The receiver 210 may receive a voice signal of a user from the outside. The receiver 210 may directly receive a voice signal from the user or may receive a voice signal of the user from an external device. For example, when the receiver 210 directly receives a voice signal from the user, the processor 220 may control the receiver 210 (e.g., a microphone included in the electronic device 200) to receive the voice signal of the user. In addition, when the receiver 210 receives a voice signal of the user from the external device, the processor may control the receiver 210 to receive the voice signal of the user from the external device via a wireless network. The wireless network may be, for example, a wireless local area network (WLAN), Wi-Fi, Bluetooth (BT), Zigbee, Wi-Fi direct (WFD), an ultra-wideband (UWB), infrared data association (IrDA), Bluetooth low energy (BLE), near field communication (NFC), or the like. However, the present disclosure is not limited thereto.

The receiver 210 may process the received voice signal of the user into voice data and may transmit the voice data to the processor 220. In particular, the receiver 210 may include hardware components such as a speaker and a microphone. The speaker and the microphone may input or output audio streams, for example, voice recognition, voice duplication, digital recording, and making phone calls. That is, the speaker and the microphone may convert voice signals into electrical signals or electrical signals into voice signals. In addition, earphones, headphones, or headsets which may be attachable or detachable may be connected to the electronic device 200 through an external port.

The processor 220 may perform various functions of the electronic device 200 by executing at least one software program. The processor 220 may perform processes for voice communication or data communication or may control voice communication or data communication. Also, the processor 220 may execute a certain software module stored in an external memory or an internal memory so as to perform a certain function corresponding to the software module. The processor 220 may perform operations of the electronic device 200 in synchronization with software modules stored in the eternal or internal memory.

The processor 220 may authenticate whether a first user has authority to control the electronic device 200 based on a first voice signal of the first user. The processor 220 may determine an instruction corresponding to the first voice signal based on an authentication result and may control the electronic device 200 according to the instruction.

In addition, with reference to FIG. 2, the processor 220 may determine whether a second voice signal includes a trigger signal. The trigger signal may be a signal that is preset to perform an operation for setting a user who has authority to control the electronic device 200. When the second voice signal includes the trigger signal, the processor 220 may set the first user as the user who has authority to control the electronic device 200 based on the second voice signal such that the electronic device 200 is controlled by a voice signal of the first user. In particular, the processor 220 may extract, from the second voice signal, a value of at least one voice parameter of the first user and may store the value of the at least one voice parameter that is extracted from the second voice signal as a reference value of the at least one voice parameter. The processor 220 may register the first user as the user who controls the electronic device 200. Later, the receiver 210 may receive the voice signal. The processor 220 may extract a value of a first voice parameter from the voice signal and may compare the value of the first voice parameter of the voice signal with a stored reference value of the first voice parameter, thereby performing user authentication.

At least one voice parameter may be at least one of voice energy of the user, a frequency bandwidth, a vibration value during an utterance by the user, and a voice signal to noise ratio (SNR). Voice parameters other than the aforementioned voice parameters may be used to authenticate a user.

When the second voice signal of the first user does not include the trigger signal, the processor 220 may authenticate whether the first user has authority to control the electronic device 200. In particular, the processor 220 may extract the value of the first voice parameter from the second voice signal and may compare the extracted value with a reference value of the first voice parameter that is previously stored. As a result of the comparison, when the value of the first voice parameter extracted from the second voice signal matches the reference value of the first voice parameter, the processor 220 may determine the first user as the user who has authority to control the electronic device 200. Also, when the value of the first voice parameter that is extracted from the second voice signal is within a certain range based on the reference value of the first voice parameter, the processor 220 may determine the first user as the user who has authority to control the electronic device 200.

When it is determined that the first user has the authority to control the electronic device 200, the processor 220 may determine a first instruction for performing a first function of the electronic device 200 based on the first voice signal and may perform the first function of the electronic device 200 according to the first instruction.

When it is determined that the first user does not have the authority to control the electronic device 200, the processor 220 may determine an instruction for bypassing the first voice signal based on the first voice signal and may bypass the first voice signal.

In addition, with reference to FIG. 2, the receiver 210 may receive voice signals of users. The processor 220 may extract a voice characteristic from each voice signal and may detect a third voice characteristic including a voice characteristic matching a reference voice characteristic from among the voice characteristics extracted from the voice signals. The reference voice characteristic may be a voice characteristic of the user who has the authority to control the electronic device 200. The voice characteristics of the user may be a frequency bandwidth according to a volume of a user's voice, a gender, an age, etc. of the user, a vibration value of the user's voice that varies with a location of the electronic device 200, and a voice SNR. The processor 220 may determine a third instruction corresponding to a third voice signal and may control the electronic device 200 according to the third instruction.

When there are multiple users who have authority to control the electronic device 200 and voice signals are received from the users, the processor 220 may preferentially determine a second instruction corresponding to a voice signal of a second user from among the users according to preset criteria and may control the electronic device 200 according to the second instruction.

The preset criteria may include priorities respectively assigned to the users according to use patterns of the electronic device 200 regarding the users or a preset order. The use patterns of the electronic device 200 may be obtained based on at least one of a use frequency and a use time of the electronic device 200 with regard to each user. The use patterns of the electronic device 200 may be determined based on examples other than the above example. In addition, the preset order may be set in the electronic device 200 in advance.

The electronic device 200 may further include a memory (not shown), a display (not shown), and a user interface (UI) (not shown). The memory (not shown) may store a trigger signal, a voice signal received from the outside, a value of a voice parameter that is extracted from the voice signal, and information regarding a user who has authority to control the electronic device 200. The information regarding the user who has authority to control the electronic device 200 may include a reference value of a voice parameter that is extracted from a voice signal of a user who has the authority to control the electronic device 200.

Also, the memory (not shown) may store information regarding users who have the authority to control the electronic device 200. The information regarding the users may include a value of a voice parameter extracted from each voice signal of each user and information regarding a use pattern of the electronic device 200 with regard to the users. The information regarding the use pattern may include at least one of a use frequency and a use time of the electronic device 200.

The memory (not shown) may include a storage medium of at least one of flash memory type, a hard disk type, a multimedia card micro type, a card type (e.g., secure digital (SD) memory, eXtreme Digital (xD) memory, etc.), a random access memory (RAM) type, a static RAM (SRAM) type, a read-only memory (ROM) type, an electrically erasable programmable ROM (EEPROM) type, a programmable ROM (PROM) type, a magnetic memory type, a magnetic disk type, and an optical disk type.

The display (not shown) may display a screen showing that the first user is set as the user who has authority to control the electronic device 200 based on the voice signal of the first user. Also, the display (not shown) may display a screen showing the reception of the first voice signal and a user authentication result (e.g., success or failure of user authentication) regarding the first voice signal. Also, the display (not shown) may perform an instruction (e.g., map searching, etc.) for controlling the electronic device 200 based on the first voice signal and may display a result (e.g., a map searching result) of performing the instruction.

The user interface (UI) (not shown) is a device that receives data used to control the electronic device 200. The UI (not shown) may include hardware components such as a key pad, a computer mouse, a touch panel, a touch screen, a track ball, and a jog switch. However, the present disclosure is not limited thereto. In particular, the UI (not shown) may receive data necessary to set the user who has authority to control the electronic device 200 through the touch screen. In addition, the memory may store the information including the priorities respectively assigned to the users.

The electronic device 200 may include a central processing unit (CPU) and may control overall operations of the receiver 210, the processor 220, the memory (not shown), the display (not shown), and the UI (not shown). The CPU may be embodied as an array of multiple logic gates or a combination of memories in which a general-purpose microprocessor and programs executable by the general-purpose microprocessor are stored. Alternatively, the CPU may be embodied as a hardware component of another type.

Hereinafter, operations or applications performed by the electronic device 200 are described. Although not specifying any one of the receiver 210, the processor 220, the memory (not shown), the display (not shown), and the UI (not shown), descriptions that are obvious to one of ordinary skill in the art are not provided. The scope of the present disclosure is not limited by a name or a physical/logical structure of a certain component.

Figure 3:
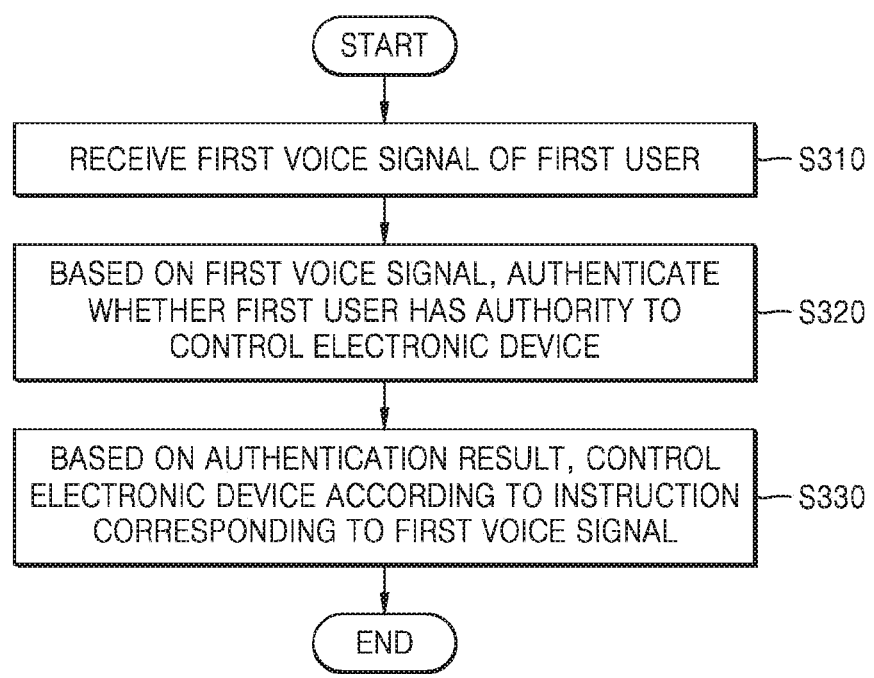
FIG. 3 is a flowchart of a method of operating an electronic device, according to an embodiment of the present disclosure.

FIG. 3 is a flowchart of a method of operating the electronic device 200, according to an embodiment of the present disclosure.

Referring to FIG. 3, in operation S310, the electronic device 200 may receive the first voice signal of the first user. The first voice signal may include an instruction for controlling the electronic device 200. The electronic device 200 may receive the first voice signal of the first user through the microphone. The first voice signal may include instructions for performing various functions of the electronic device 200, and the instructions may include an instruction for turning on/off the electronic device 200, a video reproduction instruction, a music reproduction instruction, a file management instruction, an Internet surfing instruction, and the like.

In operation S320, the electronic device 200 may authenticate whether the first user has the authority to control the electronic device 200 based on the first voice signal.

In particular, the electronic device 200 may authenticate whether the first user has the authority to control the electronic device 200 by extracting a value of a first voice parameter from the first voice signal and comparing the value of the first voice parameter with a reference value of the first voice parameter. The reference value is a value of a voice parameter obtained from a voice signal of a user who has the authority to control the electronic device 200. When the value of the first voice parameter which is extracted from the first voice signal is within a certain range based on the reference value of the first voice parameter, the electronic device 200 may determine the first user as the user who has authority to control the electronic device 200.

The voice parameter may be at least one of a voice energy of the user, a frequency bandwidth, a vibration value during an utterance by the user, and a voice SNR. However, the present disclosure is not limited thereto.

In operation S330, the electronic device 200 may determine an instruction corresponding to the first voice signal based on an authentication result and may control the electronic device 200 according to the instruction.

When it is determined that the first user has the authority to control the electronic device 200, the electronic device 200 may determine the first instruction for performing the first function of the electronic device 200 based on the first voice signal. The electronic device 200 may perform the first function of the electronic device 200 according to the first instruction. For example, the electronic device 200 may receive the first voice signal of the first user including an instruction for setting an operation time of the electronic device 200, extract the instruction for setting the operation time of the electronic device 200 from the first voice signal, and control the operation time of the electronic device 200 according to the instruction.

When it is determined that the first user does not have the authority to control the electronic device 200, the electronic device 200 may determine an instruction for bypassing the first voice signal based on the first voice signal and may bypass the first voice signal.

Figure 4:
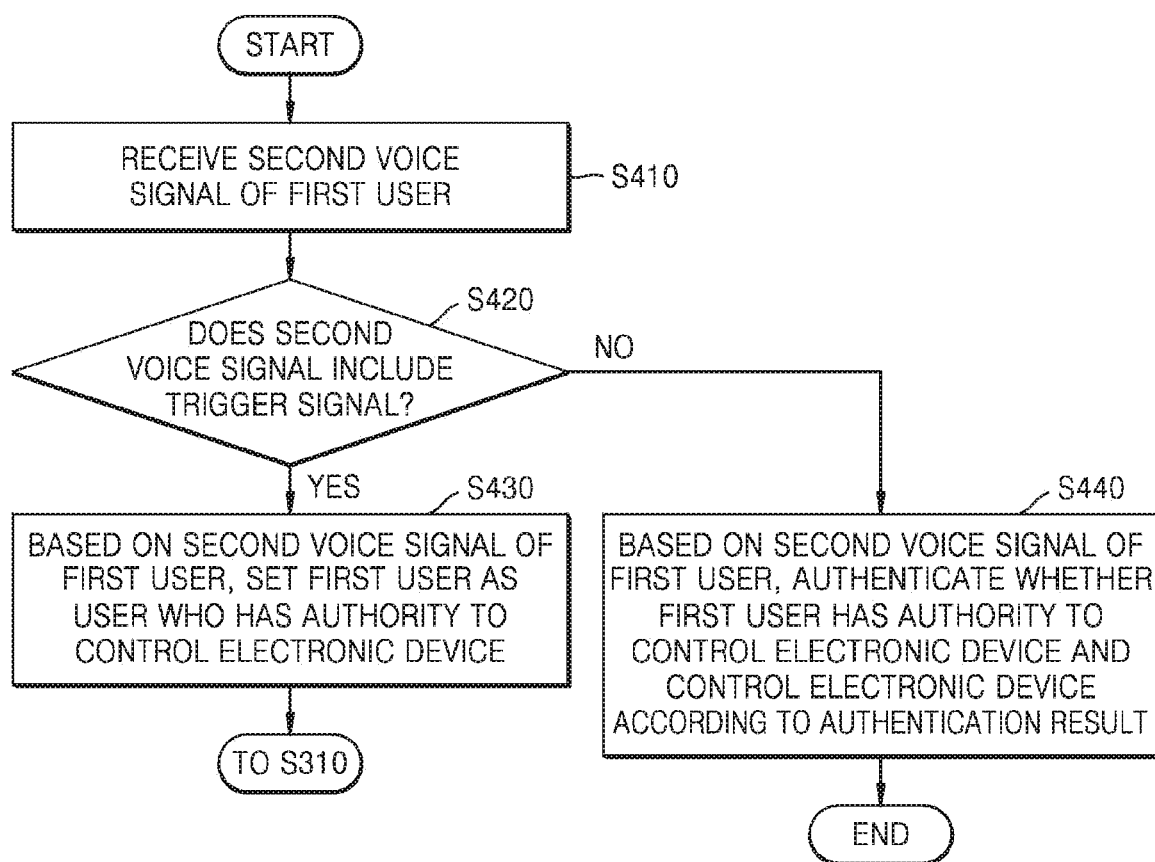
FIG. 4 is a flowchart of a method of operating an electronic device, according to another embodiment of the present disclosure.

FIG. 4 is a flowchart of a method of operating the electronic device 200, according to another embodiment of the present disclosure.

Referring to FIG. 4, in operation S410, the electronic device 200 may receive a second voice signal of the first user.

In operation S420, the electronic device 200 may determine whether the second voice signal includes a trigger signal. The trigger signal may be a signal that is set in advance to perform an operation for setting a user who has authority to control the electronic device 200. When the second voice signal includes the trigger signal, the electronic device 200 may perform operation S430. When the second voice signal does not include the trigger signal, the electronic device 200 may perform operation S440.

In operation S430, the electronic device 200 may be set to be controlled by the voice signal of the first user, based on the second voice signal. In particular, the electronic device 200 may extract a value of at least one voice parameter regarding the first user from the second voice signal. The electronic device 200 may store the value of the at least one voice parameter, which is extracted from the second voice signal, as a reference value of the at least one voice parameter. The electronic device 200 may register the first user as a user who controls the electronic device 200, based on the stored reference value.

In operation S440, the electronic device 200 may authenticate whether the first user has the authority to control the electronic device 200 based on the second voice signal and may control the electronic device 200 according to an authentication result. Operation S440 may correspond to operation S320 and operation S330 of FIG. 3.

FIGS. 5A, 5B, 5C, and 5D are diagrams for explaining a method of operating an electronic device by using voice signals of a user, according to an embodiment of the present disclosure.

Figure 5A:
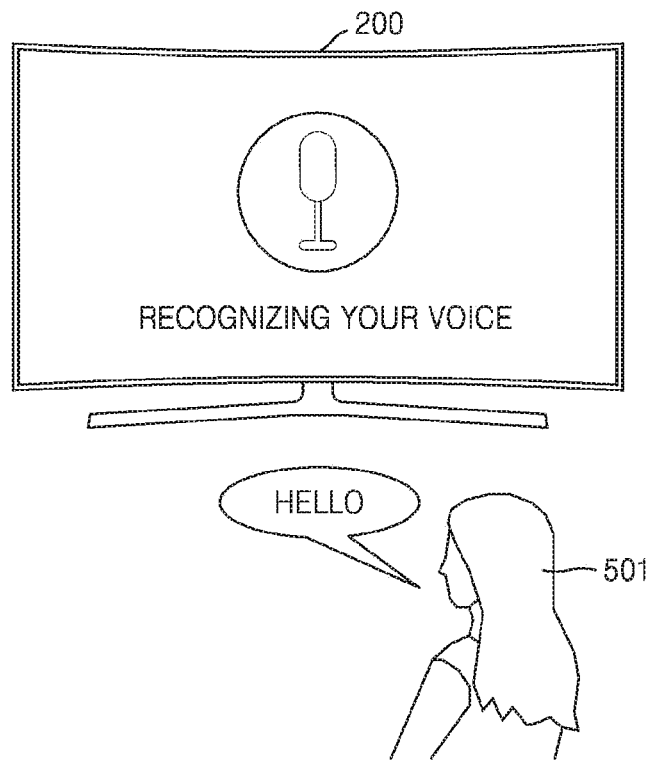
FIGS. 5A, 5B, 5C, and 5D are diagrams for explaining a method of operating an electronic device by using voice signals of a user, according to an embodiment of the present disclosure.

Referring to FIG. 5A, a first user 501 may proceed with a user registration process to control an electronic device such as a television (TV) 200 by his/her voice. When the first user 501 says "hello", the TV 200 may receive a voice signal "hello". Here, the voice signal "hello" may be preset as a trigger signal to be used to perform a process of setting a user. The TV 200 receives the voice signal "hello" of the first user 501 and may display a receiving result on a screen. As shown in FIG. 5A, when the TV 200 receives a voice signal from the outside, the TV 200 may display an expression such as "recognizing voice" on the screen. When the voice signal received from the outside is not the trigger signal, the TV 200 may perform an authentication process as to whether the electronic device may be controlled by the voice signal.

Figure 5B:
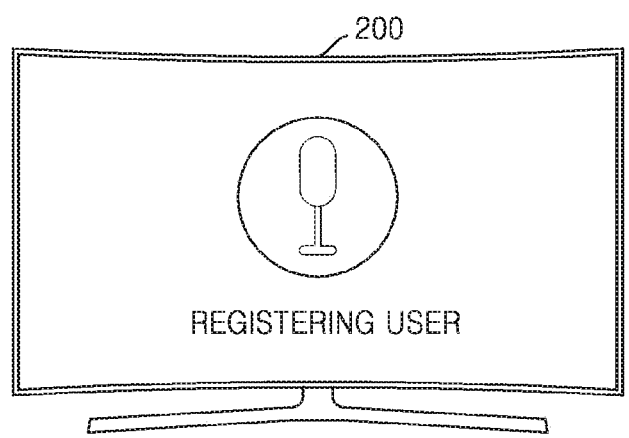

Referring to FIG. 5B, when the voice signal received from the outside is the trigger signal, the TV 200 may perform the user registration process whereby the TV 200 is controlled by the voice signal.

The TV 200 may extract a value of a first voice parameter regarding the first user 501 from the first voice signal. The TV 200 may determine the value of the first voice parameter that is extracted from the first voice signal as a reference value of the first voice parameter and may register the first user 501 as a user who has authority to control the electronic device. As shown in FIG. 5B, the TV 200 may display on the screen an expression "registering the user" during the user registration process.

Figure 5C:
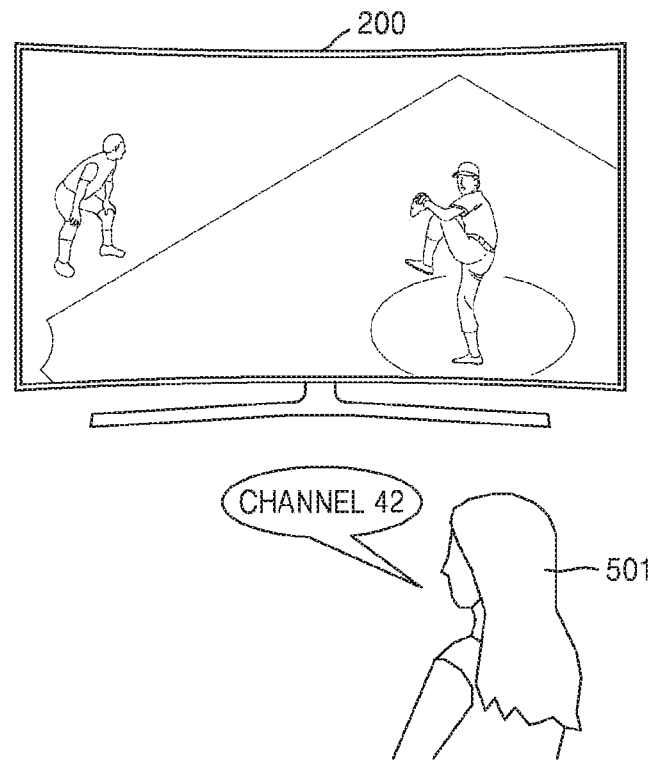

Referring to FIG. 5C, after being registered as the user who has authority to control the TV 200 by his/her voice, the first user 501 may control the TV 200 by his/her voice. When the first user 501 says a "channel 42" to change a channel, the TV 200 may extract the value of the first voice parameter from a voice signal of "channel 42" and may compare the value of the first voice parameter with a reference value of the first voice parameter. When the value of the first voice parameter matches the reference value of the first voice parameter as a result of comparison, the TV 200 may change a current channel that has been displayed to the channel 42.

Figure 5D:
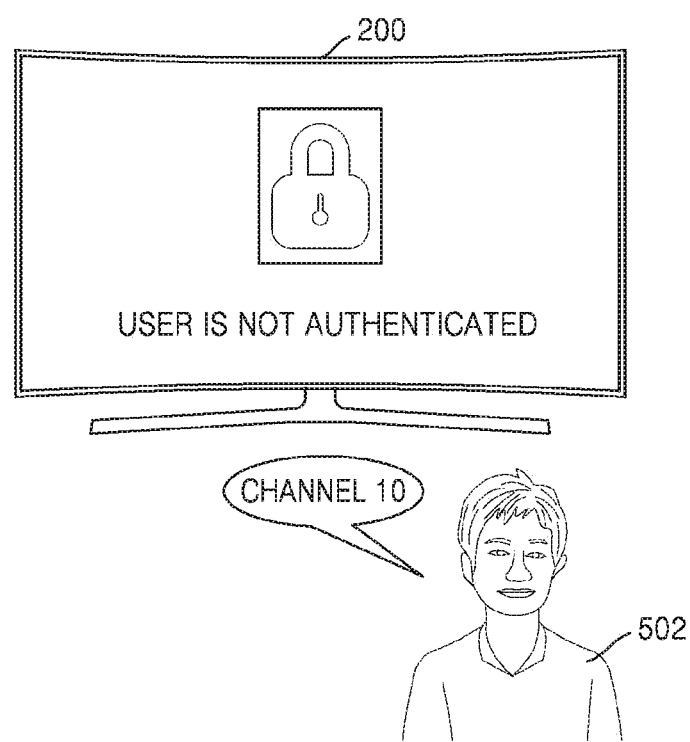

Referring to FIG. 5D, a second user 502 who is not registered as the user who has authority to control the TV 200 by his/her voice may not control the TV 200 by his/her voice. When the second user 502 says a "channel 10" to change a channel of the TV 200, the TV 200 may extract the value of the first voice parameter from a voice signal "channel 10" and may compare the value of the first voice parameter with the reference value of the first voice parameter. Since the value of the first voice parameter regarding the second user 502 does not match the reference value of the first voice parameter, the TV 200 does not change the current channel that has been displayed to the channel 10 and keep displaying the current channel. In this case, the TV 200 may display a sentence such as "the user is not authenticated".

Figure 6:
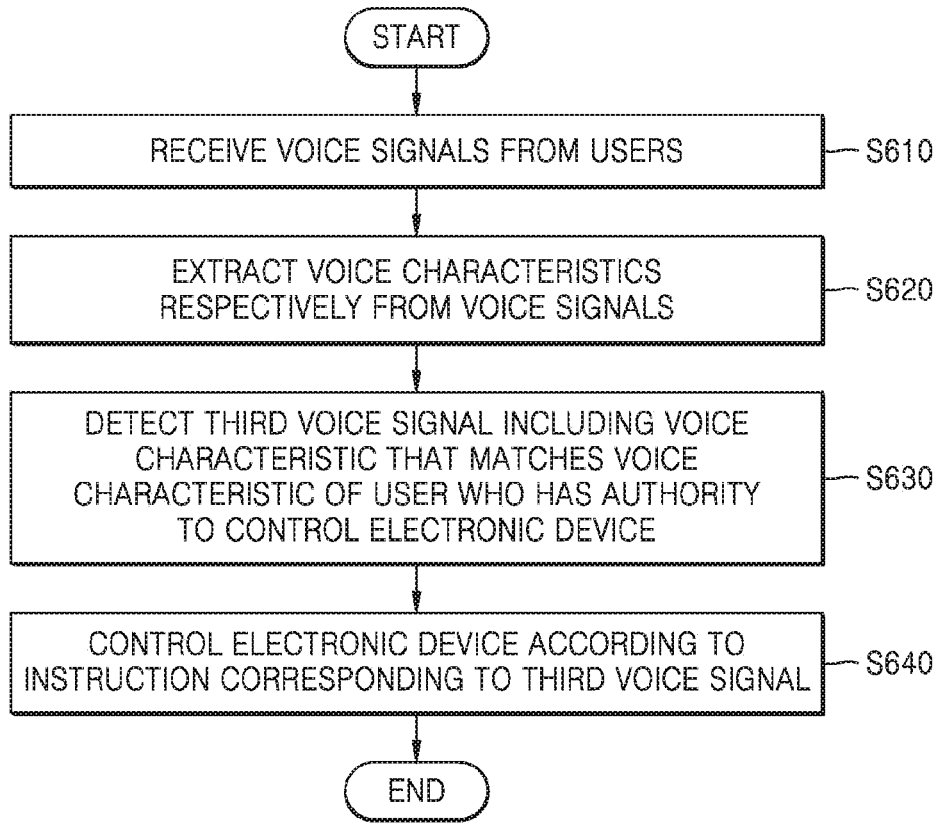
FIG. 6 is a flowchart of a method of operating an electronic device, according to another embodiment of the present disclosure.

FIG. 6 is a flowchart of a method of operating the electronic device 200, according to another embodiment of the present disclosure.

Referring to FIG. 6, in operation S610, the electronic device 200 may receive voice signals from users.

In operation S620, the electronic device 200 may extract a voice characteristic from each voice signal. The voice characteristic may be any one of a size of a user's voice, a distribution of a frequency bandwidth according to a gender, an age, etc. of the user, a vibration value of the user's voice that varies with a location of the electronic device 200, and a voice SNR. However, the present disclosure is not limited thereto.

In operation S630, the electronic device 200 may extract a third voice signal including a voice characteristic that matches a voice characteristic of the user who has the authority to control the electronic device 200, from among the voice characteristics extracted from the voice signals.

In particular, the electronic device 200 may extract a value of a first voice parameter from each voice signal. The electronic device 200 may compare the extracted value of the first voice parameter with a reference value of the first voice parameter that is set in advance. As a result of comparison, the electronic device 200 may extract the third voice signal including the value of the first voice parameter that matches the reference value of the first voice parameter.

In operation S640, the electronic device 200 may determine a third instruction corresponding to the third voice signal and may control the electronic device 200 based on the third instruction.

Figure 7:
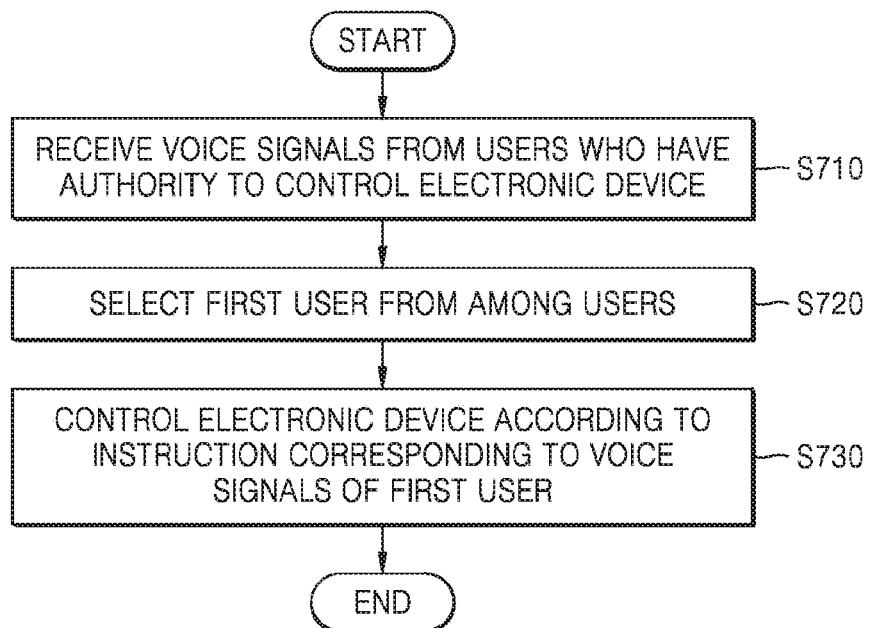
FIG. 7 is a flowchart of a method of operating an electronic device, according to another embodiment of the present disclosure.

FIG. 7 is a flowchart of a method of operating the electronic device 200, according to another embodiment of the present disclosure.

Referring to FIG. 7, in operation S710, the third instruction may receive voice signals from users who have authority to control the electronic device 200.

In operation S720, the electronic device 200 may select a first user from among the users according to preset criteria. The preset criteria may include priorities respectively assigned to the users according to a preset order or use patterns of the electronic device 200 regarding the users. The use patterns of the electronic device 200 may be obtained based on at least one of a use frequency and a use time of the electronic device 200 with regard to the users. The electronic device 200 may receive information including the priorities assigned to the users and may select the first user from among the users.

In particular, it is assumed that the first user uses the electronic device 200 more often than other users at a certain time.

When the electronic device 200 receives voice signals from the users including the first user at a certain time, the electronic device 200 may preferentially determine the voice signal of the first user as a control signal.

In operation S730, the electronic device 200 may determine an instruction corresponding to the voice signal of the first user and may control the electronic device 200 according to the determined instruction.

Figure 8:
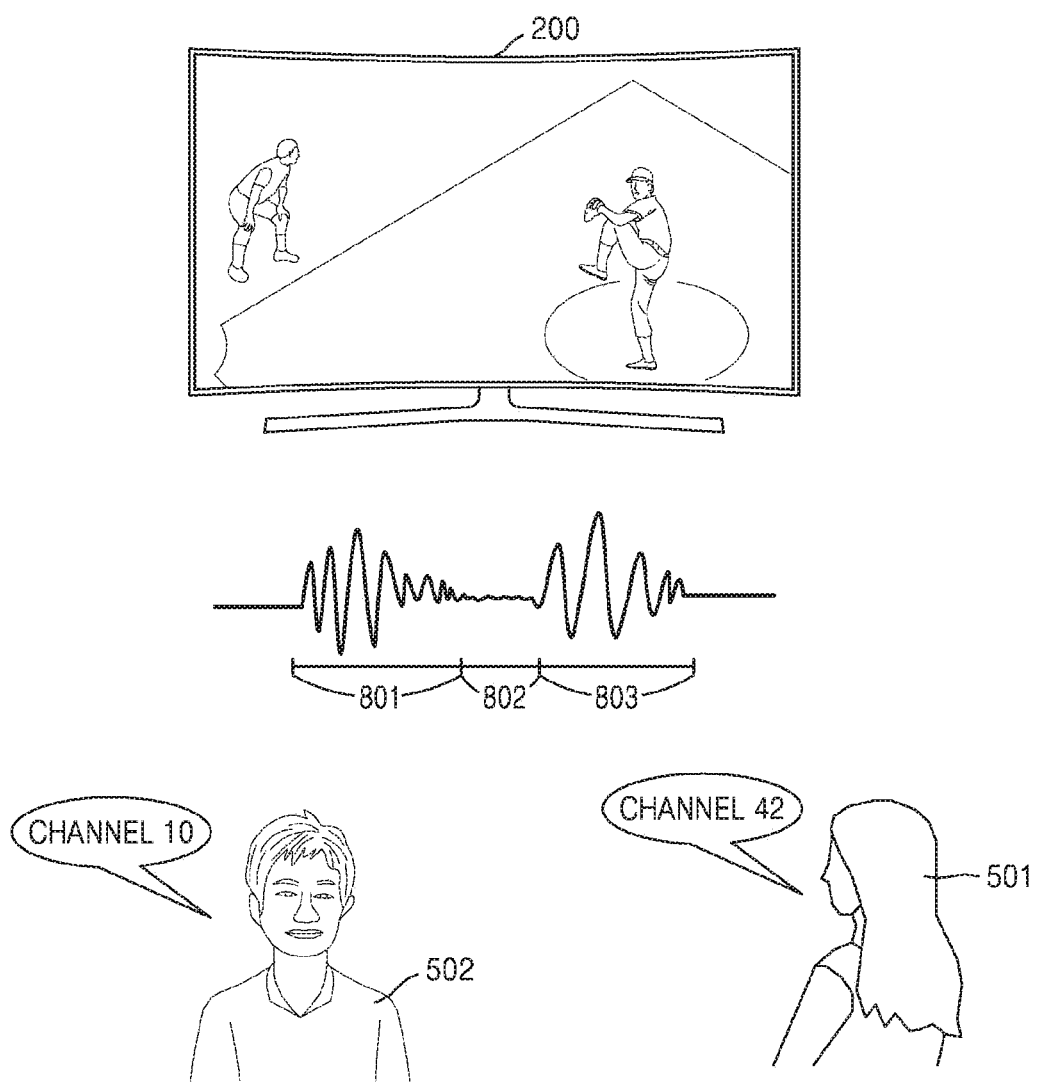
FIG. 8 is a diagram for explaining a method of operating an electronic device when voice signals are received from users according to an embodiment of the present disclosure.

FIG. 8 is a diagram for explaining a method of operating an electronic device when voice signals are received from users according to an embodiment of the present disclosure.

Referring to FIG. 8, in an embodiment of the present disclosure, it is assumed that the first user 501 has the authority to control the TV 200 by using a voice signal and the second user 502 does not have the authority to control the TV 200 by using a voice signal. The TV 200 may receive a first voice signal 801, a noise signal 802, and a second voice signal 803 from the outside. In particular, the TV 200 may receive the first voice signal 801 that is a "channel 42" from the first user 501 and the second voice signal 803 that is a "channel 10" from the second user 502. The TV 200 may extract a value of a first voice parameter from each of the first voice signal 801 and the second voice signal 803 and may compare the extracted values with a reference value of the first voice parameter. As a result of comparison, the TV 200 may carry out an instruction corresponding to the first voice signal 801 having the value of the first voice parameter that matches the reference value of the first voice parameter. That is, the TV 200 may determine an instruction for changing a current channel to the "channel 42" based on the first voice signal 801 of the first user 501 and may change the current channel to the "channel 42" according to the determined instruction. In addition, the second user 502 may set the authority to control the TV 200 by using a voice signal and control the TV 200 by using the voice signal.

In another embodiment of the present disclosure, it is assumed that the first user 501 and the second user 502 have the authority to control the TV 200 by using voice signals. The TV 200 may receive the first voice signal 801, the noise signal 802, and the second voice signal 803 from the outside. In particular, the TV 200 may receive the first voice signal 801 that is the "channel 42" from the first user 501 and the second voice signal 803 that is the "channel 10" from the second user 502. In this case, the TV 200 may perform an operation according to an instruction corresponding only to a voice signal of one of the first user 501 and the second user 502. The TV 200 may preferentially determine an instruction corresponding to a voice signal of any one of the users according to preset criteria and may perform an operation of the TV 200 according to the determined instruction. The preset criteria may include priorities respectively assigned to the users according to the use patterns of the TV 200 of the users or a preset order. One of ordinary skill in the art may easily understand that the priorities may be respectively assigned to the users according to the use patterns of the TV 200 as well as other factors.

Figure 9:
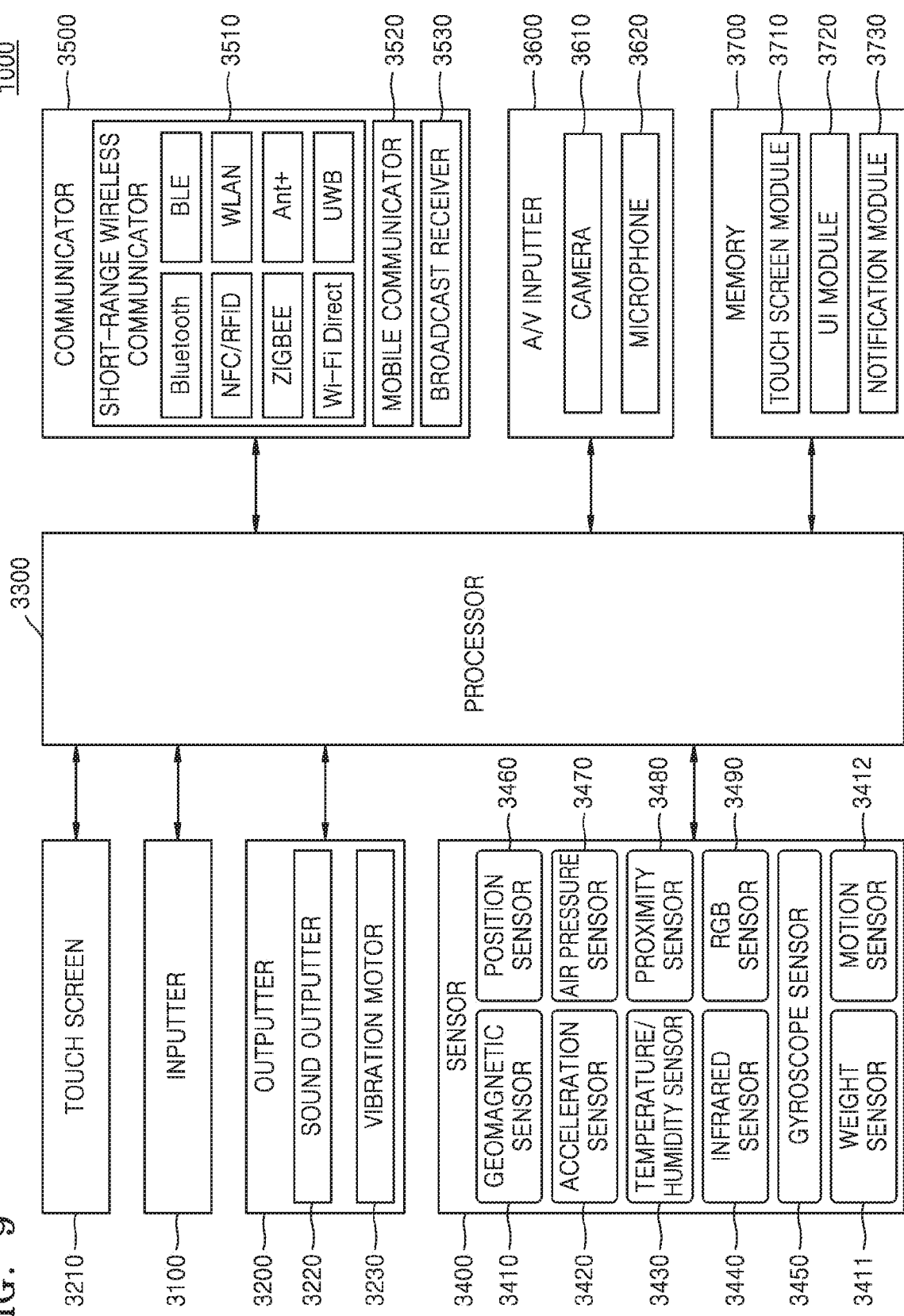
FIG. 9 is a block diagram of a structure of an electronic device according to an embodiment of the present disclosure.

FIG. 9 is a block diagram of a structure of an electronic device 1000 according to an embodiment of the present disclosure.

Referring to FIG. 9, the electronic device 1000 may correspond to the electronic device 200 of FIG. 2. In particular, a processor 3300 (e.g. at least one processor) of FIG. 9 may correspond to the processor of FIG. 2, and a communicator 3500 of FIG. 9 may correspond to the receiver 210 of FIG. 2. A memory 3700 of FIG. 9 may correspond to the memory (not shown) of FIG. 2, and an inputter 3100 of FIG. 9 may correspond to the user interface (not shown) of the electronic device 200 of FIG. 2.

The inputter 3100 denotes a unit for inputting data used by the user to control the electronic device 1000. For example, the inputter 3100 may be a key pad, a dome switch, a touch pad (e.g., a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, a jog switch, etc. However, the present disclosure is not limited thereto.

An outputter 3200 may output an audio signal, a video signal, or a vibration signal. The outputter 3200 may include a sound outputter 3220 and a vibration motor 3230.

The touch screen 3210 may include at least one of a liquid crystal display (LCD), a thin film transistor-LCD (TFT LCD), an organic light-emitting diode (OLED) display, a flexible display, a 3-dimensional (3D) display, an electrophoretic display. Depending on an implementation type of the electronic device 1000, the electronic device 1000 may include at least two touch screens 3210. In this case, the at least two touch screens 3210 may face each other by using a hinge.

The sound outputter 3220 outputs audio data received from the communicator 3500 or stored in the memory 3700. Also, the sound outputter 3220 outputs audio signals regarding functions (e.g., a call signal receiving sound, a message receiving sound, an alarm sound, etc.) performed by the electronic device 1000. The sound outputter 3220 may include, for example, a speaker, a buzzer, or the like.

The vibration motor 3230 may output a vibration signal. For example, the vibration motor 3230 may output a vibration signal corresponding to an output of audio data or video data (e.g., a call signal receiving sound, a message receiving sound, etc.). In addition, the vibration motor 3230 may output a vibration signal when a touch input is received by the touch screen 3210.

The processor 3300 may control overall operations of the electronic device 1000. For example, the processor 3300 may execute programs stored in the memory 3700 and thus may control the components of the electronic device 1000 to operate.

A sensor 3400 may detect a contact of a body part of the user and may obtain biometric information based on the detected contact. The sensor 3400 may include at least one of a geomagnetic sensor 3410, a weight sensor 3411, a motion sensor 3412, an acceleration sensor 3420, a temperature/humidity sensor 3430, an infrared sensor 3440, a gyroscope sensor 3450, a position sensor 3460, an air pressure sensor 3470, a proximity sensor 3480, and a red, green, and blue (RGB) sensor 3490. However, the present disclosure is not limited thereto. Since one of ordinary skill in the art may intuitively infer functions of each sensor from its name, detailed descriptions regarding their functions will be omitted.

The communicator 3500 may include at least one component for communicating with an external device (not shown). For example, the communicator 3500 may include a short-range wireless communicator 3510, a mobile communicator 3520, and a broadcast receiver 3530.

The short-range wireless communicator 3510 may include a Bluetooth communicator, a Bluetooth Low Energy (BLE) communicator, a Near Field Communicator, a WLAN (Wi-Fi) communicator, a Zigbee communicator, an infrared Data Association (IrDA) communicator, a Wi-Fi Direct (WFD) communicator, an ultra wideband (UWB) communicator, an Ant+ communicator, and the like. However, the present disclosure is not limited thereto.

The mobile communicator 3520 receives/transmits wireless signals from/to at least one of a broadcast station, an external electronic device, and a server via a mobile network. The wireless signals may include various types of data according to reception/transmission of a voice call signal, a video-telephone call signal, or a text message/multimedia message.

The broadcast receiver 3530 receives broadcast signals and/or information regarding broadcasts from the outside through broadcast channels. The broadcast channels include satellite channels and terrestrial channels. According to various embodiments of the present disclosure, the electronic device 1000 may not include the broadcast receiver 3530.

An audio/video (A/V) inputter 3600 receives an audio signal input or a video signal input and may include a camera 3610 and a microphone 3620. The camera 3610 may obtain an image frame such as a still image or a moving image by using an image sensor in a video call mode or a photographing mode. Images captured by the image sensor may be processed by the processor 3300 or a separate image processor (not shown).

An image frame processed by the camera 3610 may be stored in the memory 3700 or transmitted to the outside through the communicator 3500. There may be at least two cameras 3610 according to a structure of the electronic device 1000.

The microphone 3620 may process received external sound signals into electrical voice data. For example, the microphone 3620 may receive sound signals from an external device or a speaker. The microphone 3620 may use a variety of noise removal algorithms to remove noise generated while the external sound signals are received.

The memory 3700 may store programs used for processes performed by the processor 3300 or used to control the processor 3300 and may store data input to or output from the electronic device 1000.

The memory 3700 may include a storage medium of at least one of flash memory type, a hard disk type, a multimedia card micro type, a card type (e.g., SD memory, xD memory, etc.), a random-access memory (RAM) type, a static random access memory (SRAM) type, a read-only memory (ROM) type, an electrically erasable programmable read-only memory (EEPROM) type, a programmable read-only memory (PROM) type, a magnetic memory type, a magnetic disk type, and an optical disk type.

The programs stored in the memory 3700 may be classified into modules according to functions of the programs. For example, the programs may be classified into a touch screen module 3710, a user interface (UI) module 3720, and a notification module 3730.

With regard to the touch screen module 3710, there may be various sensors within or around a touch screen in order to detect a touch or a proximity touch of the touch screen. A touch gesture of the user may include, for example, a tap gesture, a touch & hold gesture, a double tap gesture, a drag gesture, a panning gesture, a flick gesture, a drag & drop gesture, a swipe gesture, or the like.

The UI module 2720 may provide a specialized UI or a graphical UI (GUI) which interoperates with the electronic device 1000 according to applications. The touch screen module 3710 may detect a user's touch gesture on the touch screen and may transmit information related to the touch gesture to the processor 3300. In some embodiments, the touch screen module may recognize and analyze a touch code. The touch screen module 3710 may be configured as a separate hardware component including a controller.

The notification module 3730 may generate a signal to notify generation of events in the electronic device 1000. Examples of the events generated in the electronic device 1000 may be call signal reception, message reception, generation of messages, a key signal input, schedule notification, and the like. The notification module 3730 may output a notification signal as a video signal through the touch screen 3210, as an audio signal through the sound outputter 3220, or as a vibration signal through the vibration motor 3230.

The devices described above may be implemented as hardware components, software components, and/or a combination of hardware components and software components. For example, the devices and components described above may be, for example, processors, controllers, arithmetic logic units (ALUs), digital signal processors, micro-computers, field programmable arrays (FPAs), programmable logic units (PLUs), microprocessors, or general-use or special purpose computers that may carry out or respond to instructions.

A processing device may execute an operation system (OS) or at least one software application executable on the OS. Also, the processing device may access, store, manipulate, process, or generate data in response to the execution of the software application.

One of ordinary skill in the art may understand that the processing device may include multiple processing elements and/or processing elements of various types. For example, the processing device may include one or more processors and one controller. In addition, the processing device may have a different processing configuration, for example, a parallel processor.

Software may include a computer program, a code, an instruction, or any combination thereof. The software may design processing devices to operate as desired and may independently or collectively send instructions to the processing devices.

Software and/or data may be permanently or temporarily embodied in certain machines, components, physical equipment, virtual equipment, computer-readable recording media, or signal waves in order to be read by processing devices or to provide instructions or data to the processing devices. The software can be distributed over network-coupled computer systems so that the software is stored and executed in a distributed fashion. The software and data can be stored in at least one computer-readable recording medium.

The various embodiments of the present disclosure can be implemented as program instructions executable by various computer media and can be written to non-transitory computer-readable recording media. The non-transitory computer-readable recording media may individually or collectively include program instructions, data files, data structures, and the like. The program instructions included in the non-transitory computer-readable recording media may be specifically designed for the various embodiments or may be well known to one of ordinary skill in the art.

Examples of the non-transitory computer-readable recording medium include magnetic storage media (e.g., floppy disks, hard disks, magnetic tapes, etc.), optical recording media (e.g., compact disc (CD)-ROMs, or digital versatile discs (DVDs)), magneto-optical media (e.g., floptical disks), and hardware devices (e.g., ROM, RAM, flash memory, etc.) configured to store and execute program instructions.

Examples of the program instructions include machine language codes produced by compilers as well as high-level language codes executable by computers by using interpreters, or the like.

The hardware device may operate as at least one software module for performing operations according to the various embodiments, and vice versa.

It should be understood that various embodiments described herein should be considered in a descriptive sense only and not for purposes of limitation. Descriptions of features or aspects within each embodiment should typically be considered as available for other similar features or aspects in other embodiments. For example, a specific process order may be performed differently from the described order, and/or elements such as specific systems, structures, devices, or circuits may be combined differently from the described order. In addition, it is to be appreciated that all changes, equivalents, and substitutes that do not depart from the spirit and technical scope are encompassed in the present disclosure.

While the present disclosure has been shown and described with reference to various embodiments thereof, it will be understood by those of skilled in the art that various changes in form and details may be made therein without departing from the spirit and scope of the present disclosure as defined by the appended claims and their equivalents.

What is claimed is:

1. A method of operating an electronic device, the method comprising:
   obtaining, by at least one processor of the electronic device, a sound wave;
   identifying, by the at least one processor, whether a user associated with the sound wave is registered at the electronic device based on at least one parameter of the sound wave;
   in a case that the user associated with the sound wave is identified as not being registered at the electronic device:
      identifying whether the sound wave includes a trigger command for registering the user associated with the sound wave at the electronic device,
      registering the user associated with the sound wave such that the user is capable of controlling the electronic device using a voice signal in a case that the sound wave includes the trigger command for registering the user associated with the sound wave at the electronic device, and
      authenticating, by the at least one processor, in a case that the sound wave does not include the trigger command for registering the user associated with the sound wave at the electronic device, whether the user has an authority to control the electronic device and controlling, by the at least one processor, the electronic device according to a first instruction included in the information extracted from the sound wave, based on an authentication result; and in a case that the user associated with the sound wave is identified as being registered at the electronic device:
identifying whether the user associated with the sound wave has the authority to issue a command to control the electronic device based on information extracted from the sound wave, and
controlling, by the at least one processor, the electronic device based on the first instruction included in the information extracted from the sound wave in a case that the user has the authority to issue the command to control the electronic device.

2. The method of claim 1, wherein the registering of the user associated with the sound wave further comprises:
extracting information from the sound wave to identify whether the sound wave includes the trigger command for registering the user associated with the sound wave at the electronic device,
in a case that the sound wave includes the trigger command for registering the user associated with the sound wave at the electronic device, extracting, by the at least one processor, a first parameter from the sound wave, and
storing, in a memory of the electronic device, the first parameter with information corresponding to the user associated with the sound wave such that the user is registered at the electronic device.

3. The method of claim 1, wherein the at least one parameter of the sound wave comprises at least one of a voice energy of the user associated with the sound wave, a frequency bandwidth, a vibration value generated during an utterance by the user associated with the sound wave, or a voice signal to noise ratio (SNR).

4. The method of claim 1, wherein the identifying of whether the user associated with the sound wave has the authority to issue the command to control the electronic device further comprises:
extracting information from the sound wave, and
identifying whether the information extracted from the sound wave includes at least one instruction for controlling the electronic device based on information corresponding to a plurality of users stored in the memory of the electronic device.

5. The method of claim 4, further comprising:
registering the plurality of users based on a sound wave associated with each of the plurality of users,
wherein the identifying of whether the information extracted from the sound wave includes at least one instruction for controlling the electronic device further comprises:
comparing the information extracted from the sound wave to information associated with each of the plurality of users registered at the electronic device, and
in a case that the information extracted from the sound wave corresponds to a portion of the information associated with each of the plurality of users registered at the electronic device, identifying one or more instructions the user is authorized to issue to control the electronic device, and
wherein the first instruction is included in the one or more instructions that the user is authorized to issue to control the electronic device.

6. The method of claim 1, further comprising:
disregarding the sound wave based on identifying that the sound wave does not include the trigger command for registering the user associated with the sound wave at the electronic device.

7. The method of claim 1, further comprising:
identifying that the sound wave includes voice signal information generated by a first user and voice signal information generated by a second user; and
based on identifying that the first user and the second user are registered at the electronic device, identifying whether the first user or the second user has the authority to issue the command to control the electronic device.

8. The method of claim 7, further comprising:
based on identifying that the first user and the second user have the authority to issue the command to control the electronic device, identifying whether to prioritize a command associated with the first user or a command associated with the second user based on preset criteria.

9. The method of claim 8, wherein the preset criteria comprise priorities respectively assigned to the first user and the second user based on a preset order or a use pattern of the electronic device with regard to each of the first user and the second user.

10. The method of claim 9, wherein the use pattern of the electronic device is obtained based on at least one of a use frequency of the electronic device, or a use time of the electronic device with regard to the first user and the second user.

11. An electronic device comprising:
a receiver configured to obtain a sound wave; and
at least one processor configured to:
identify whether a user associated with the sound wave is registered at the electronic device based on at least one parameter of the sound wave,
in a case that the user associated with the sound wave is identified as not being registered at the electronic device:
identify whether the sound wave includes a trigger command for registering the user associated with the sound wave at the electronic device,
register the user associated with the sound wave such that the user is capable of controlling the electronic device using a voice signal in a case that the sound wave includes the trigger command for registering the user associated with the sound wave at the electronic device, and
authenticate, in a case that the sound wave does not include the trigger command for registering the user associated with the sound wave at the electronic device, whether the user has an authority to control the electronic device and control the electronic device according to a first instruction included in the information extracted from the sound wave, based on an authentication result, and
in a case that the user associated with the sound wave is identified as being registered at the electronic device:
identify whether the user associated with the sound wave has the authority to issue a command to control the electronic device based on information extracted from the sound wave, and
control the electronic device based on the first instruction included in the information extracted from the sound wave in a case that the user has the authority to issue the command to control the electronic device.

12. The electronic device of claim 11, further comprising:
a memory,
wherein, to register the user associated with the sound wave, the at least one processor is further configured to:
extract information from the sound wave to identify whether the sound wave includes the trigger command for registering the user associated with the sound wave at the electronic device,
in a case that the sound wave includes the trigger command for registering the user associated with the sound wave at the electronic device, extract a first parameter from the sound wave, and
store, in the memory, the first parameter with the information corresponding to the user associated with the sound wave such that the user is registered at the electronic device.

13. The electronic device of claim 11, wherein, to identify whether the user associated with the sound wave has the authority to issue the command to control the electronic device, the at least one processor is further configured to:
extract information from the sound wave, and
identify whether the information extracted from the sound wave includes at least one instruction for controlling the electronic device based on information corresponding to a plurality of users stored in a memory of the electronic device.

14. The electronic device of claim 13,
wherein the at least one processor is further configured to register the plurality of users based on a sound wave associated with each of the plurality of users,
wherein, to identify whether the information extracted from the sound wave includes at least one instruction for controlling the electronic device, the at least one processor is further configured to:
compare the information extracted from the sound wave to information associated with each of the plurality of users registered at the electronic device, and
in a case that the information extracted from the sound wave corresponds to a portion of the information associated with each of the plurality of users registered at the electronic device, identify one or more instructions the user is authorized to issue to control the electronic device, and
wherein the first instruction is included in the one or more instructions that the user is authorized to issue to control the electronic device.

15. The electronic device of claim 11, wherein the at least one processor is further configured to disregard the sound wave based on identifying that the sound wave does not include the trigger command for registering the user associated with the sound wave at the electronic device.

16. The electronic device of claim 11,
wherein the at least one processor is further configured to:
identify that the sound wave includes voice signal information generated by a first user and voice signal information generated by a second user, and
based on identifying that the first user and the second user are registered at the electronic device, identify whether the first user or the second user has the authority to issue the command to control the electronic device.

17. The electronic device of claim 16, wherein the at least one processor is further configured to, based on identifying that the first user and the second user have the authority to issue the command to control the electronic device, identify whether to prioritize a command associated with the first user or a command associated with the second user based on preset criteria.

18. The electronic device of claim 17, wherein the preset criteria comprise priorities respectively assigned to the first user and the second user based on a use pattern of the electronic device with regard to each of the first user and the second user.

* * * * *